United States Patent [19]
Kim

[11] Patent Number: 6,026,001
[45] Date of Patent: Feb. 15, 2000

[54] POWER SUPPLYING DEVICE IN PRIMARY SIDE OF POWER CIRCUIT

[75] Inventor: Eun-Sub Kim, Suwon-si, Rep. of Korea

[73] Assignee: SamSung Electronics Co., Ltd., Suwon, Rep. of Korea

[21] Appl. No.: 09/036,790

[22] Filed: Mar. 9, 1998

[30] Foreign Application Priority Data

Mar. 8, 1997 [KR] Rep. of Korea .......................... 97-4204

[51] Int. Cl.[7] .................................................. H02H 7/10
[52] U.S. Cl. ................................................ 363/50; 363/41
[58] Field of Search .................................. 363/16, 17, 21, 363/39, 40, 41, 50, 55, 56, 65, 80, 147, 49

[56] References Cited

U.S. PATENT DOCUMENTS

| | | | |
|---|---|---|---|
| 2,841,641 | 11/1958 | Faulk | 363/80 X |
| 2,905,491 | 5/1959 | Kim | 363/41 X |
| 5,453,921 | 9/1995 | Shutts | 363/41 X |
| 5,812,383 | 9/1998 | Majid et al. | 363/49 X |

*Primary Examiner*—Y. J. Han
*Attorney, Agent, or Firm*—Robert E. Bushnell, Esq.

[57] ABSTRACT

A power supplying device in a primary side of a power circuit is provided, including: a main power transformer including a coil for receiving DC output from a first rectifier, to be turned on/off according a PWM pulse output from a PWM IC, thereby inducing current, and for separately supplying the induced current; a power transistor for receiving DC power output from a second rectifier according to power off mode, to drop voltage, the second rectifier receiving and rectifying the current output from the main power transformer in DPMS mode operation; and a third rectifier for receiving and rectifying current induced through the coil inserted into the main power transformer in the normal operation, to supply power to the primary side of a power circuit. Current is induced through a separate coil to be used as the power of the primary side of the power circuit in the normal operation of the main power transformer, and, in the power off mode, a transistor of the power transistor drops voltage, solving problems in heat emission and thermal damage in the transistor due to large amount of voltage drop.

5 Claims, 3 Drawing Sheets ined below
POWER SUPPLYING DEVICE IN PRIMARY SIDE OF POWER CIRCUIT

CLAIM OF PRIORITY

This application makes reference to, incorporates the same herein, and claims all benefits accruing under 35 U.S.C. §119 from my application entitled *Power Supplying Device in Primary Side of Power circuit* filed with the Korean Industrial Property Office on Mar. 8, 1997 and there duly assigned Serial No. 97-4204 by that Office.

BACKGROUND OF THE INVENTION

1. Field of the Invention

The present invention relates to a power supplying device in a primary side of a power circuit and, more particularly, to a power supplying device in a primary side of a power circuit of a display monitor to which a display power management signalling (DPMS) mode is applied, the power supplying device protecting a transistor from thermal damage due to voltage drop.

2. Discussion of Related Art

Recently, a variety of electric products and electronic products have been spread, and their consumption powers have become lower with the development of electric and electronic technologies. Among these products, a display monitor, for displaying data of a personal computer (PC) as visual images, uses high voltage for displaying the data. Accordingly, display monitor manufacturers are making their efforts to reduce the power consumed in the display monitor using high voltage and to apply VESA standard or like to the display monitor. A conventional display monitor to which the VESA standard is applied is explained below with reference to the attached drawing.

FIG. 1 is a block diagram of an inner circuit of a conventional display monitor. Referring to FIG. 1, a PC 100 includes a CPU 110 for receiving and processing a keyboard signal, and generating data according to the result processed, and a video card 120 for receiving the data from CPU 110, processing it to generate an image signal (R,G,B), and outputting a horizontal synchronous signal H-SYNC and vertical synchronous signal V-SYNC for synchronizing the image signal (R,G,B). A monitor 200, which receives the image signal, horizontal and vertical synchronous signals H-SYNC and V-SYNC output from video card 120 included in PC 100, comprises a microcomputer 210 for receiving the horizontal and vertical synchronous signals to judge resolution, a control button 220 for generating a picture control signal for controlling a display monitor picture and outputting it, a horizontal and vertical output circuit 230 for receiving the monitor picture control signal from microcomputer 210 and a reference oscillation signal, to synchronize raster, a video circuit 240 for receiving the image signal (R,G,B) from video card 120, amplifying and displaying it, and a power circuit 250 for supplying drive voltage to microcomputer 210, horizontal and vertical output circuit 230 and video circuit 240.

Inner blocks of display monitor 200 are described below in more detail. The horizontal and vertical synchronous signals H-SYNC and V-SYNC output from video card 120 of PC 100 are applied to microcomputer 210 storing various picture control data. Microcomputer 210 outputs an image control signal for controlling an image displayed on the monitor picture and the reference oscillation signal according to the picture control signal applied from control button 220. The image control signal and reference oscillation signal are sent from microcomputer 210 to a horizontal and vertical oscillation signals processor 230-1 which applies a vertical pulse for controlling the switching speed of on/off operation of a sawtooth generating circuit to a vertical drive circuit 230-2 according to the horizontal and vertical synchronous signals supplied from video card 120.

Vertical drive circuit 230-2, which received the vertical pulse, generally employs an one-stage vertical amplifying type, or emitter follower type in which a signal is input to the base of transistor and output from its emitter. Accordingly, it improves linearity rather than gain. Vertical drive circuit 230-2 sends a current signal to a vertical output circuit 230-3 which generates sawtooth current which flows through a V-DY 230-4, corresponding to a vertical synchronous pulse, determining a vertical scanning cycle. Horizontal and vertical oscillation signals processor 230-1 outputs a horizontal oscillation signal to a horizonal drive circuit 230-5 which supplies current sufficient for turning on/off a horizonal output circuit 230-6. Horizontal drive circuit 230-5 is divided into an in-phase (the same polarity) mode in which the output port is turned on when the drive port is turned on, and reverse phase (reverse polarity) mode, being currently widely used, in which the output port is turned off when the drive port is turned on. Horizontal output circuit 230-6, which received current from horizontal drive circuit 230-5 having the above characteristics, generates sawtooth current and sends it to an H-DY 230-7. This sawtooth current determines a horizontal scanning cycle.

To supply a stable DC voltage to the anode of a cathode ray tube (CRT) 240-4, a flyback collector according to a flyback transformer (FBT) 230-9 is employed and harmonics according to leakage inductance and distributed capacity of high voltage circuit 230-8 are used, to generate high voltage and apply it to anode port 240-4-1 of CRT 240-4, even though the collector pulse is small. Anode port 140-4-1 creates high voltage on the anode surface according to the applied high voltage, to control the luminance of the image signal (R,G,B) amplified by image signal processor 240. Here, an OSD 240-1 of image signal processor 240 receives OSD data in accordance with the picture control from microcomputer 210, to output an OSD gain signal.

The OSD gain signal output from OSD 240-1 and the image signal (R,G,B) applied from video card 120 are sent to a video pre-amplifier 240-2 which amplifies the low-level image signal (R,G,B) with a low voltage amplifier, maintaining a specific level of voltage of the signal. For example, a signal below 1 Vpp (peak to peak voltage) is amplified to 4–6 Vpp. A video output amplifier 240-3 amplifies the pre-amplified signal of 4–6 Vpp to 40–60 Vpp, supplying energy to each pixel of the display. The image signal amplified by video output amplifier 240-3 is sent to the cathode of CRT 240-4, to be converted into electron beam, displaying an image according to the image signal on the picture of the monitor.

In case of selection of OSD, the OSD is selected by video pre-amplifier 240-2, amplified to a predetermined level, and finally amplified by video output amplifier 240-3, displaying the OSD data on the picture of CRT 240-4. The OSD data displayed on CRT 240-4 provides a user of display monitor 200 with functions of the monitor or information on the monitor. Power circuit 250, which supplies drive voltage for displaying the image signal on the display monitor picture, receives alternating current (AC) through an AC input terminal 250-1 to which common AC is applied. A degaussing coil 250-2 receives the AC through AC input terminal 250-1, and recovers colors spread by terrestrial magnetism or external conditions to the original colors. For example, when AC is applied to degaussing coil 250-2 for 2 to 9 seconds, DC component of magnetism formed on a shadow mask in display monitor 200 is dispersed. This recovers the color spread caused by inexact deflection of electron beam to fluorescent material due to the DC component of magnetism.

DC rectified by a rectifier 250-3 is applied to a switching transistor 250-4. With the application of DC, switching transistor 250-4 performs switching operation to supply various drive voltages required for inner blocks of display monitor 200 through a voltage regulator 250-5. Here, a pulse width modulation (PWM) IC 250-6 controls turn on/off operations of switching transistor 250-4, to stabilize output voltage. Meantime, microcomputer 210 executes the DPMS mode based on VESA standard such as power off mode and suspend mode according to the detection of the horizontal and vertical synchronous signals, reducing the power consumed in display monitor 200. In this conventional display monitor 200, the power circuit to which the DPMS mode is applied is divided into a mode of supplying power to a primary side of the power circuit using a main power and auxiliary power, and a mode of supplying power to the primary side of the power circuit, the duty of PWM pulse in the main power being minimized. The second mode is explained below with reference to FIG. 2 showing a circuit diagram of the power circuit of FIG. 1.

As shown in FIG. 2, common power of AC is applied to ports IN1 and IN2 through AC input terminal 250-1 (shown in FIG. 1). The noise in the AC is filtered by a noise filter (not shown), and then the AC is rectified by a bridge diode 250-3a of rectifier 250-3. This rectified current is smoothed by a smoothing capacitor C1, to generate DC power at a resistor R1. The DC power is calculated by (DC power≈ $\sqrt{2}\times$AC power), and the calculated DC power is supplied to PWM IC 250-6 (shown in FIG. 1) through a node (a). PWM IC 250-6 starts a main power transformer T1 of a switching transformer 250-4 according to the applied DC power. That is, the PWM pulse applied through PWM IC 50-6 repeatedly allows and blocks the current flow to a primary coil L1 of main power transformer T1, to induce current to a secondary coil L2. The current induced to the secondary coil L2 of the main power transformer T1 is rectified by a diode D1 and capacitor C2, to generate DC power, providing power to the primary side of the power circuit. Here, the DC power is supplied to the primary side, its voltage being dropped through a transistor Q1.

When the power off mode according to the DPMS mode is executed in the above power circuit, it is required that the consumption power is 5W in the power off mode, and 15W in the suspend mode. To satisfy this, on duty of the PWM pulse output through PWM IC 250-6 should be minimized. However, in case of wrong power circuit design, it is impossible to satisfy the DPMS standard even if the on duty of PWM pulse is minimized. When the consumption power becomes below 5W in the power off mode owing to the minimized PWM pulse duty, power at a point (b) is required to be higher than power at a point (c) (power of the primary side) to enable the normal operation. For example, in the normal operation, the voltage at point (b) must be 80V when the voltage at point (c) is 12V. Furthermore, in the power off mode, the voltage at point (b) must be 14V when the voltage at point (c) is 12V. Thus, the turn ratio of secondary coil L2 of transformer T1 should be determined to allow the potential at point (b) to be considerably higher than the potential at point (c) in the normal mode. Accordingly, to supply the voltage at point (b) to the primary side of the power circuit, large amount of voltage drop is needed. Transistor Q1 for dropping large amount of voltage emits heat corresponding to the amount of dropped voltage, and thus transistor Q1 needs large heat sink to emit the heat due to the voltage drop. Furthermore, the transistor may be destructed due to the heat, shortening its life.

SUMMARY OF THE INVENTION

Accordingly, the present invention is directed to a power supplying device in a primary side of a power circuit that substantially obviates one or more of the problems due to limitations and disadvantages of the related art.

An objective of the present invention is to provide a power supplying device in a primary side of a power circuit, in which a coil with a low turn ratio and rectifier are inserted into a main power transformer, to separately supply power to the primary side of the power circuit, thereby protecting its power transistor from thermal damage.

To accomplish the objective of the present invention there is provided a power supplying device in a primary side of a power circuit, including: a main power transformer including a coil for receiving DC output from a first rectifier, to be turned on/off according a PWM pulse output from a PWM IC, thereby inducing current, and for separately supplying the induced current; a power transistor for receiving DC power output from a second rectifier according to power off mode, to drop voltage, the second rectifier receiving and rectifying the current output from the main power transformer in DPMS mode operation; and a third rectifier for receiving and rectifying current induced through the coil inserted into the main power transformer in the normal operation, to supply power to the primary side of a power circuit.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention:

DETAILED DESCRIPTION OF PREFERRED EMBODIMENT

Reference will now be made in detail to the preferred embodiments of the present invention, examples of which are illustrated in the accompanying drawings.

Figure 1:
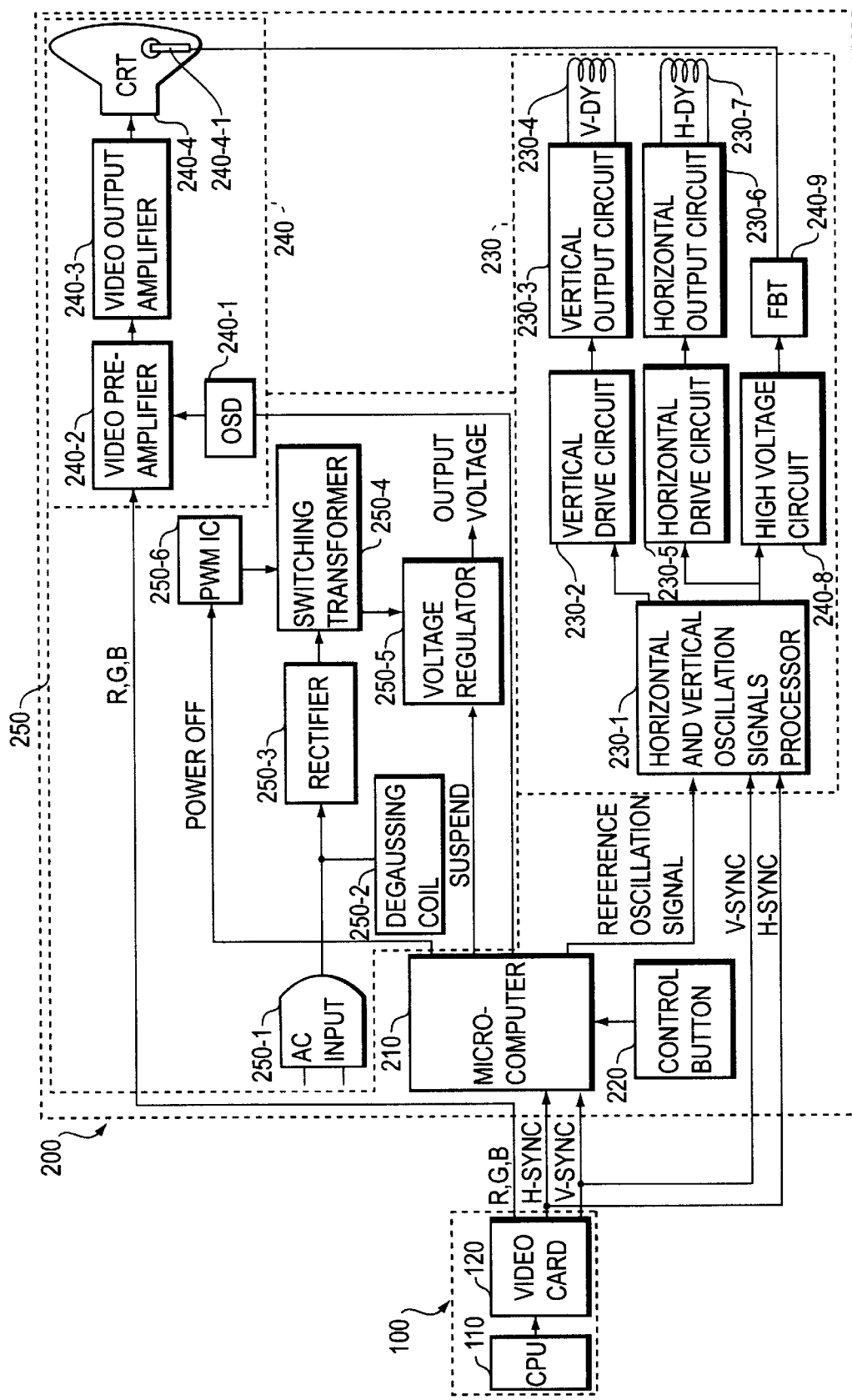
FIG. 1 is a block diagram showing an inner circuit of a conventional display monitor.
Figure 2:
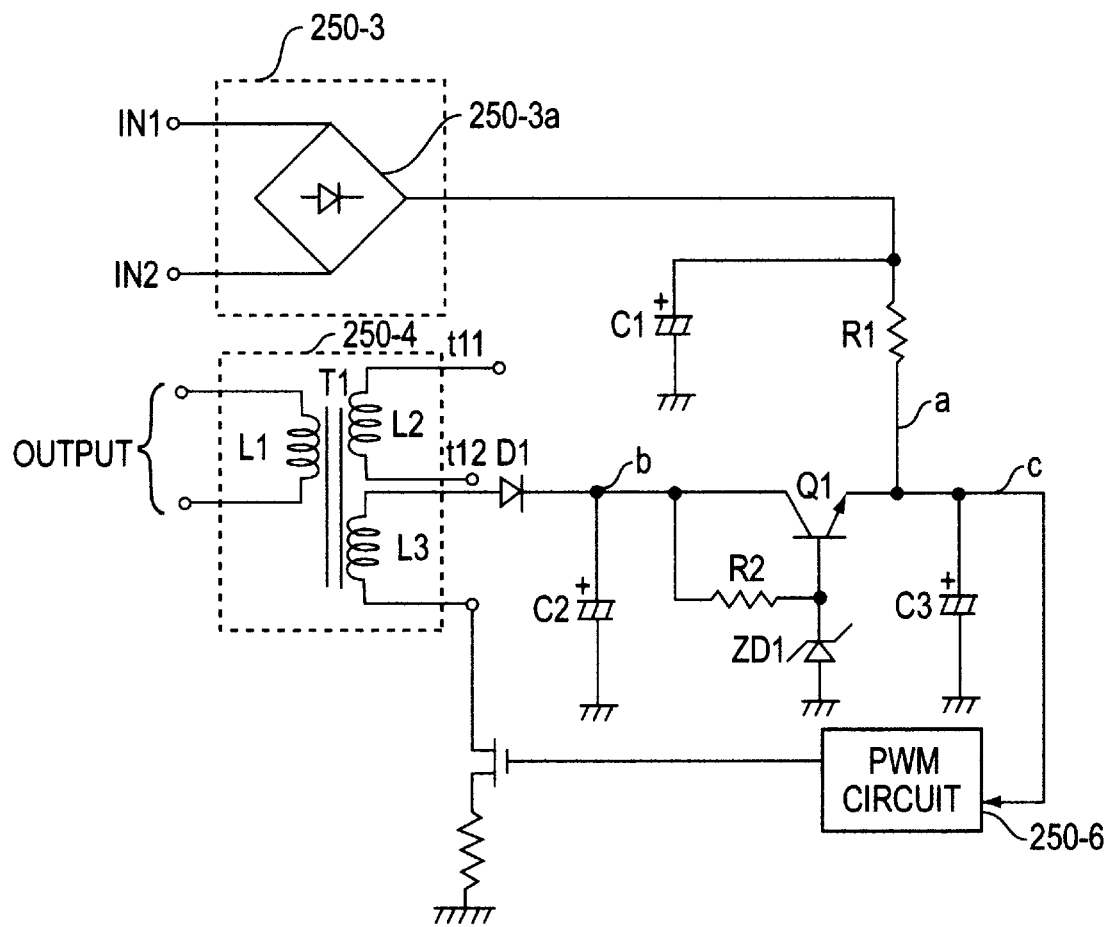
FIG. 2 is a circuit diagram of the power circuit shown in FIG. 1.
Figure 3:
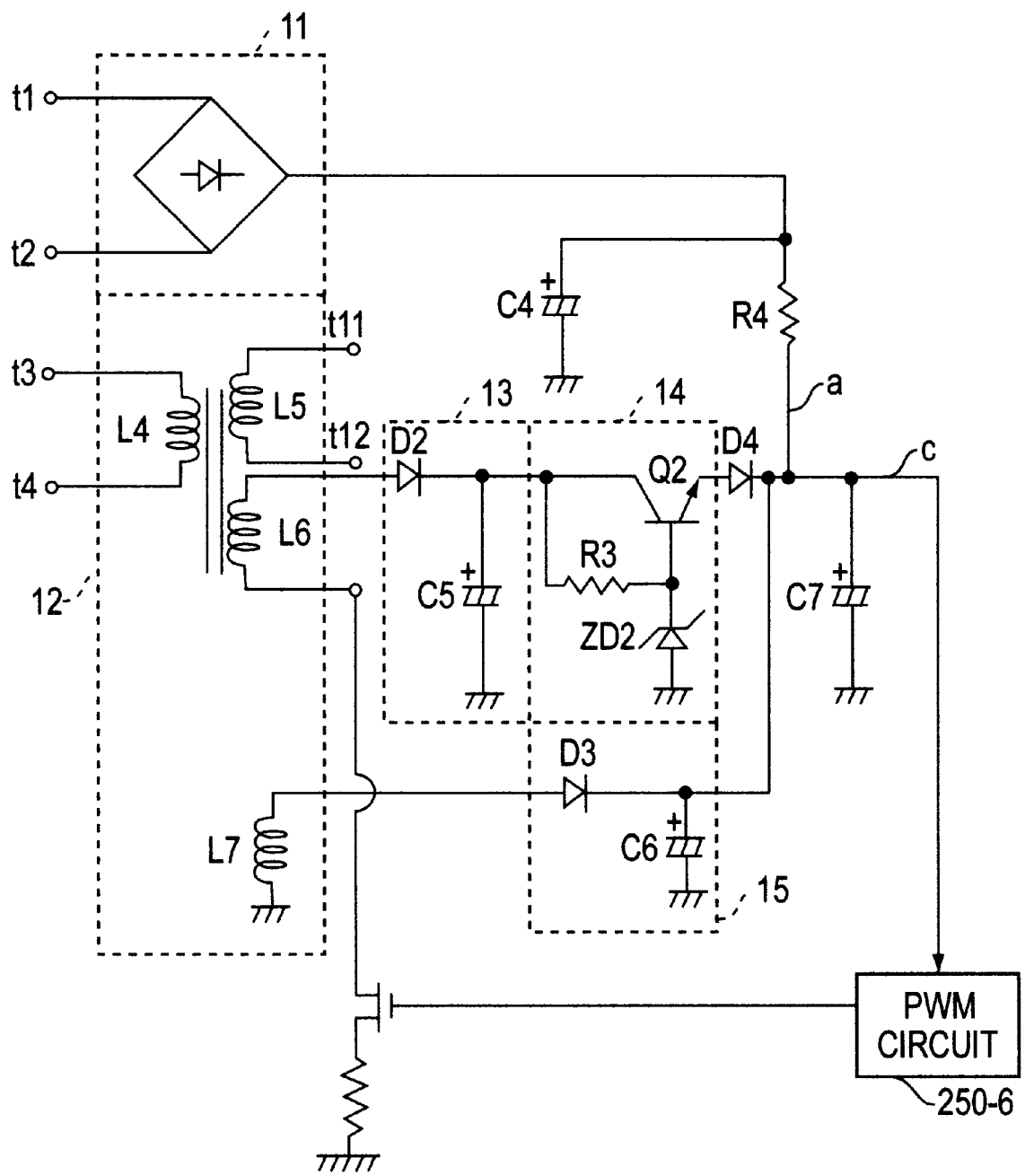
FIG. 3 is a circuit diagram of a power circuit according to the present invention.

FIG. 3 is a circuit diagram of a power circuit according to the present invention. Referring to FIG. 3, the power circuit of the invention includes a first rectifier 11 for receiving AC and rectifying it, a PWM IC (not shown) for receiving DC output from the first rectifier 11 and generating a PWM pulse, a main power transformer 12 having a coil L7 which receives the DC output from the first rectifier 11, to be turned on/off according to the PWM pulse generated by the PWM IC to induce current, and separately supplies the induced current, a second rectifier 13 for receiving and rectifying the current from main power transformer 12 in the DPMS mode, a power transistor 14 for receiving the DC power output from second rectifier 13 according to the power off mode and dropping the voltage, a capacitor C7 for receiving the power whose voltage is dropped from power transistor 14, smoothing it, and supplying it to a primary side of the power circuit, and a third rectifier 15 for receiving and rectifying the current induced by coil L7 inserted into main power transformer 12 in the normal operation, and supplying the power to the primary side.

In this configuration, first rectifier 11 is configured of a bridge diode, and second rectifier 13 consists of a diode D2 receiving and rectifying the current induced by secondary coil L6 in main power transformer 12, and a capacitor C5 receiving and smoothing the current rectified by diode D2. Power transistor 14 is configured of a transistor Q2 which receives DC voltage smoothed by capacitor C5 to its collector, receives a reference voltage from a zener diode ZD2 to its base, drops the received DC voltage and outputs it through its emitter. Third rectifier 15 consists of a diode D3 receiving and rectifying the current induced by coil L7 to which current is induced in the normal operation, and a capacitor C6 receiving the rectified current from diode D3 and smoothing it.

The operation of the aforementioned power circuit is described below. The horizontal and vertical synchronous signals are generated when a video card (not shown) installed in a PC is normally operated, which executes application programs and processes data generated according to the executed result into an image signal. If the normal horizontal and vertical synchronous signals are generated by the video card, the inner blocks of the display monitor (not shown) are normally operated. Then, the power circuit in the display monitor receives and rectifies the AC input to power input terminals t1 and t2 through the bridge diode forming first rectifier 11. The current rectified by the bridge diode of first rectifier 11 is smoothed by capacitor C4, to be induced through resistor R4. The DC power induced through resistor R4 is drawn at a node A, to drive the PWM IC.

The PWM IC, driven by receiving the DC power induced through resistor R4 at node (b), operates main power transformer 12, to supply the power to the primary side of the power circuit. That is, main power transformer 12 turns on/off the current applied to primary coil L4 according to the width of the PWM pulse output through the PWM IC. Currents, input through ports t3 and t4 of main power transformer 12, are applied to primary coil L4 or not, according to the cycle of the PWM pulse. This is explained below in more detail. The current is accumulated at primary coil L4 during off-duty in the cycle of the PWM pulse. On the other hand, reverse electromotive force generates at primary coil L4 during on-duty in the PWM pulse cycle. When the reverse electromotive force is created at primary coil L4 of main power transformer 12, current flows through secondary coils L5, L6 and L7 due to induction effect. This current is rectified by diode D2 of second rectifier 13, and smoothed by capacitor C5, to be applied to the collector of transistor W2 of power transistor 13.

Transistor Q2 receives the DC voltage to its collector from second rectifier 13, and also receives a specific level of voltage to its base through zener diode ZD2. Here, the operation condition of transistor Q2 is that the potential of zener diode ZD2 of power transistor 14 must be lower than the potential at a point B. That is, the following condition should be satisfied.

The potential of zener diode ZD2<the potential at point B

When this condition is satisfied, transistor Q2 of power transistor 14 is turned off so that it cannot apply current to the primary side of the power circuit because the potential of its emitter is higher than that of its base. Here, diode D4 is used for preventing small amount of current which flows to the emitter of transistor Q2 in the normal operation. As described above, due to the turning off of transistor Q2 in the normal operation, the current, induced to the secondary coil of main power transformer 12, is induced to coil L7. This current is rectified by diode D3 of third rectifier 15, and smoothed by capacitor C6, generating DC. The generated DC is smoothed by capacitor C7, to be used as power to the primary side of the power circuit.

Meanwhile, when the horizontal and vertical synchronous signals according to the VESA standard are not generated by the video card in the PC, the power circuit of the display monitor executes the power off mode of the DPMS mode. The PWM IC minimizes the on-duty in the cycle of the PWM pulse output according to the power off mode. The rapid reduction in the on-duty in the cycle of the PWM pulse generated by the PWM IC decreases the current induced by main power transformer 12. Here, current is not induced through coil L7 having turn ratio lower than that of secondary coil L6 of main power transformer 12, preventing the power from outputting through third rectifier 15. On the other side, the current is induced through coil L6 having turn ratio higher than that of coil L7. The current induced through coil L6 is rectified by third rectifier 13 and smoothed, to be applied to power transistor 14. The DC rectified by second rectifier 13 is applied to the collector of transistor Q2 of power transistor 14. The base of transistor Q2 receives a specific level of voltage through zener diode ZD2.

Transistor Q2 is turned on with the specific level of voltage applied to its base through zener diode ZD2, to drop the voltage to a predetermined level, outputting it through its emitter. The voltage output from the emitter of transistor Q2 is smoothed by capacitor C7, to generate power to the primary side according to the power off mode. Accordingly, current is induced through coil L7 to be used as power of the primary side of the power circuit in case of the normal operation. In case of the power off mode of DPMS mode, current is induced through coil L6 to apply voltage, lower than that in case of the normal operation, to transistor Q2. By doing so, it is possible to solve problems in heat emission and thermal damage in the transistor due to large amount of voltage drop.

As described above, according to the present invention, current is induced through a separate coil to be used as the power of the primary side of the power circuit in the normal operation of the main power transformer. Furthermore, in the power off mode, a transistor of the power transistor drops voltage, solving problems in heat emission and thermal damage in the transistor due to large amount of voltage drop.

It will be apparent to those skilled in the art that various modifications and variations can be made in the power supplying device in a primary side of a power circuit of the present invention without departing from the spirit or scope of the invention. Thus, it is intended that the present invention cover the modifications and variations of this invention provided they come within the scope of the appended claims and their equivalents.

What is claimed is:

1. A power supplying device in a primary side of a power circuit, comprising:

a main power transformer including a coil for receiving DC output from a first rectifier, to be turned on/off according a PWM pulse output from a PWM IC, thereby inducing current, and for separately supplying the induced current;

a power transistor for receiving DC power output from a second rectifier according to power off mode, to drop voltage, the second rectifier receiving and rectifying the current output from the main power transformer in DPMS mode operation; and a third rectifier for receiving and rectifying current induced through the coil inserted into the main power transformer in the normal operation, to supply power to the primary side of a power circuit.

2. The power supplying device as claimed in claim 1, wherein the power transistor is designed in such a manner that the base potential of transistor is lower than its emitter potential.

3. The power supplying device as claimed in claim 1, wherein the third rectifier comprises:

a diode for receiving and rectifying current induced by the coil inserted into the main power transformer, current being induced to the coil in the normal operation; and a capacitor for receiving and smoothing the current rectified by the diode.

4. A power supplying device in a primary side of a power circuit, comprising:

a main power transformer including a coil for receiving DC output from a first rectifier, to be turned on/off according a PWM pulse output from a PWM IC, thereby inducing current, and for separately supplying the induced current;

a power transistor, having a base potential of transistor is lower than its emitter potential, for receiving DC power output from a second rectifier according to power off mode, to drop voltage, the second rectifier receiving and rectifying the current output from the main power transformer in DPMS mode operation; and a third rectifier for receiving and rectifying current induced through the coil inserted into the main power transformer in the normal operation, to supply power to the primary side of a power circuit.

5. The power supplying device as claimed in claim 4, wherein the third rectifier comprises:

a diode for receiving and rectifying current induced by the coil inserted into the main power transformer, current being induced to the coil in the normal operation; and a capacitor for receiving and smoothing the current rectified by the diode.

* * * * *